M. A. BENEDICT.
EGG CARRIER.
APPLICATION FILED NOV. 30, 1918.
1,426,246. Patented Aug. 15, 1922.
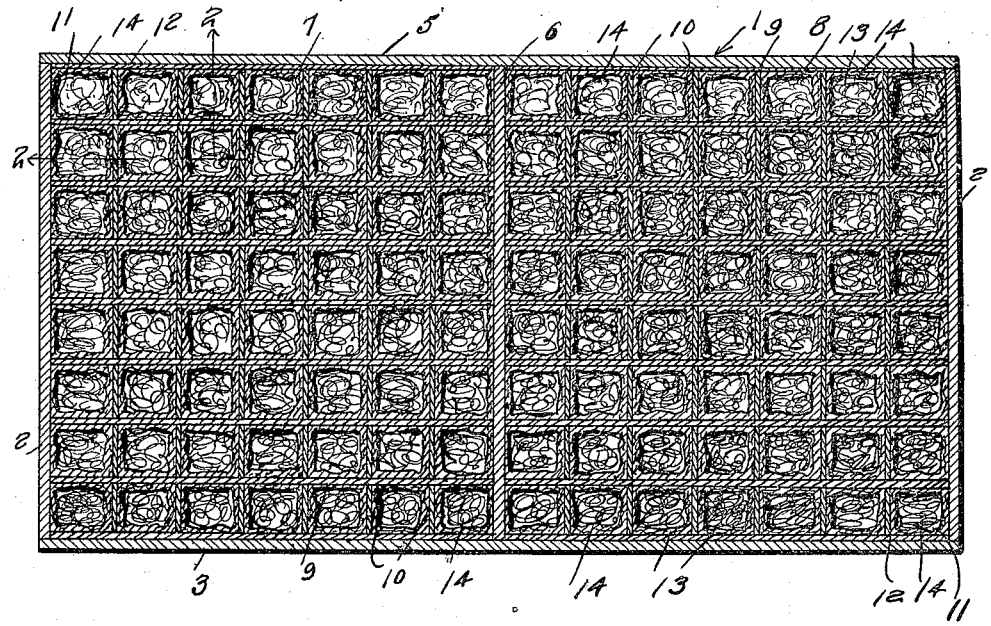
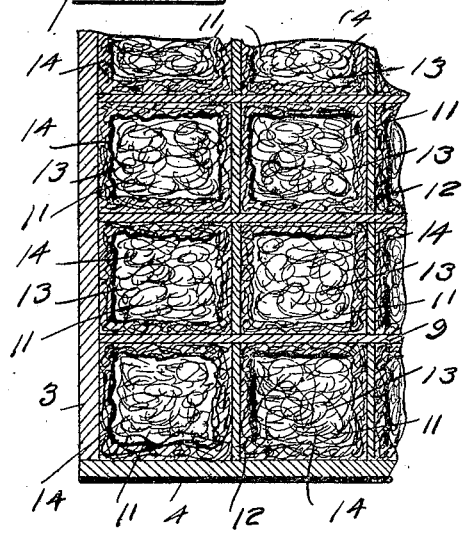
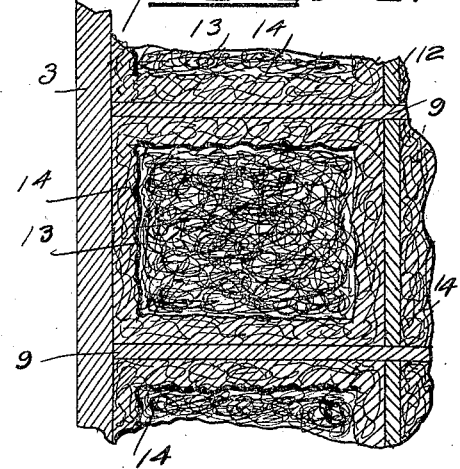

UNITED STATES PATENT OFFICE.

MARIA A. BENEDICT, OF NEW YORK, N. Y.

EGG CARRIER.

1,426,246.  Specification of Letters Patent.  Patented Aug. 15, 1922.

Application filed November 30, 1918. Serial No. 264,825.

*To all whom it may concern:*

Be it known that I, MARIA A. BENEDICT, a citizen of the United States, residing at New York city, in the county of New York and State of New York, have invented certain new and useful Improvements in Egg Carriers; and I do hereby declare the following to be a full, clear, and exact description of the invention, such as will enable others skilled in the art to which it appertains to make and use the same.

This invention relates to egg crates and the like, and the primary object of the invention is to provide an improved shipping crate for eggs, which is so constructed that the likelihood of the eggs becoming broken in transportation is eliminated.

Another object of the invention is to provide an improved crate for eggs and the like, having a soft yielding substance, such as mineral wool, glued or otherwise secured to the side walls and cardboard partitions thereof, for preventing the vibration or jarring of the eggs and thereby preventing the breaking of the same.

A further object of the invention is to provide an improved shipping crate having a soft yielding substance, secured to the walls and cardboard partitions of the crate to form a shock absorbing rest for the eggs which will also effectively form a non-conductor of heat.

A still further object of the invention is to provide an improved shipping crate of the above character, which is durable and efficient in use, one that is simple and easy to manufacture, and one that can be placed upon the market at a reasonable cost.

With these and other objects in view, the invention consists in the novel construction, arrangement and formation of parts, as will be hereinafter more specifically described, claimed and illustrated in the accompanying drawings forming a part thereof, in which:
Figure 1 is a central vertical section through an ordinary egg shipping crate.

Figure 2 is a fragmentary horizontal section taken on line 2—2 of Figure 1.

Figure 3 is an enlarged fragmentary vertical section through the crate.

Referring to the drawings in detail, wherein similar reference characters designate corresponding parts throughout the several views, the numeral 1 generally indicates a shipping crate commonly used for shipping eggs to grocers or the like and which are commonly constructed to hold thirty dozen eggs. It is to be understood, however, that the invention can be applied to a crate holding any quantity of eggs and can be readily used in connection with the small boxes or crates used for shipping eggs by parcel post or by freight.

The crate 1 includes the end walls 2, the bottom wall 3, side walls 4, and the removable top wall 5. The crate 1 is divided by a central wooden partition 6, which forms the same into a pair of compartments 7 and 8. Each compartment is adapted to receive the ordinary horizontal cardboard partitions 9 upon which are adapted to rest the cardboard division members 10 which are constructed in the ordinary manner and include the longitudinally extending strips 11 and the transverse strips 12 which form a plurality of individual cells 13 for the eggs. The inner and outer faces of the strips 11 and 12 are adapted to have secured thereto mineral wool 14, which forms a cushion for the eggs. The cardboard partition plates 9 are adapted to have secured thereto on the upper and lower surfaces mineral or slag wool 14. The sides and end walls 3 and 4 of the crate are also provided with mineral wool 14. The wool is preferably held in place by means of glue or a similar substance by which the wool is to be applied or attached.

While mineral wool is especially claimed, as the same has been found to be the best substance used for this purpose as the same forms a yielding cushion for the eggs, which can be applied at a minimum amount of expense and also forms a heat insulator for the eggs, it is to be understood that other material can be used in lieu of the mineral wool if so desired.

By placing the mineral wool on the strips 11 and 12, and the inner surface of the crate, a complete cushion is provided for the eggs, which prevents jarring of the eggs and breaking of the same during transit.

In practice, I have found that the form of my invention illustrated in the accompanying drawings and referred to in the above description, as the preferred embodiment, is the most efficient and practical; yet realizing the conditions concurrent with the adoption of my device will necessarily vary, I desire to emphasize that various minor changes in details of construction, proportion and arrangement of parts may be resorted to, when

What I claim as new is:

1. An egg carrier having a tray provided with a pocket, cushioning means for the egg in said pocket, a tray resting on said tray and closing the open end of the pocket, and said second tray having an egg cushioning means on the under surface of its bottom wall over and exposed to the pocket.

2. An egg carrier having a tray provided with pockets, mineral wool lining said pockets, a tray resting on said tray and closing the open ends of the pockets thereof, and the second tray having mineral wool on the under surface of its bottom wall over and exposed to said pockets.

In testimony whereof I affix my signature in presence of two witnesses.

MARIA A. BENEDICT.

Witnesses:
E. F. RAYMOND,
GEO. D. WEEKS.